United States Patent [19]

Clark

[11] 4,027,073

[45] May 31, 1977

[54] PIGMENT-FREE COATING COMPOSITIONS

[75] Inventor: Harold A. Clark, Midland, Mich.

[73] Assignee: Dow Corning Corporation, Midland, Mich.

[22] Filed: June 21, 1976

[21] Appl. No.: 698,234

Related U.S. Application Data

[62] Division of Ser. No. 482,961, June 25, 1974, Pat. No. 3,986,997.

[52] U.S. Cl. .......................... 428/412; 260/29.2 M; 351/166; 428/447; 428/480; 428/500
[51] Int. Cl.² .......................................... B32B 9/04
[58] Field of Search ............ 428/12, 447, 480, 500; 351/166; 260/29.2 M

[56] References Cited

UNITED STATES PATENTS

| | | | |
|---|---|---|---|
| 2,568,384 | 9/1951 | Cheronis | 260/29.2 M |
| 2,610,167 | 9/1952 | Te Grotenhuis | 260/37 SB |
| 2,786,042 | 3/1957 | Iler | 260/45.6 R |
| 3,435,001 | 3/1969 | Merrill | 260/37 SB |
| 3,560,244 | 2/1971 | Neuroth | 428/447 |
| 3,775,171 | 11/1973 | Hermes | 351/166 |
| 3,808,027 | 4/1974 | Anderson et al. | 428/480 |

*Primary Examiner*—J. Ziegler
*Attorney, Agent, or Firm*—Norman E. Lewis

[57] ABSTRACT

An acidic dispersion of colloidal silica and hydroxylated silsesquioxane in an alcohol-water medium is coated onto solid substrates, such as acrylic lenses, to provide an abrasion resistant coating.

20 Claims, No Drawings

PIGMENT-FREE COATING COMPOSITIONS

This is a division of application Ser. No. 482,961, filed June 25, 1974, now U.S. Pat. No. 3,986,997.

BACKGROUND OF THE INVENTION

This invention relates to a protective coating composition. In one aspect the invention relates to a transparent abrasion resistant coating. In another aspect, the invention relates to a stable dispersion of colloidal silica and a silicone resin.

There is a need for transparent glazing materials which exhibit a greater resistance to shattering than glass. Synthetic organic polymers can be formed into transparent enclosures and these materials, such as polycarbonates and acrylics, are finding use in glazing for autos, buses and aircraft and as windows in public buildings. While these polymers are easily fabricated into the desired shape, and are less dense and have more resistance to breakage than glass, their abrasion resistance is relatively low. This lack of surface hardness and abrasion resistance has severely restricted the use of these transparent polymeric materials. Other uses of the polymeric materials, such as glazing decorative architectural panels and mirrors, are also limited because of this lack of abrasion resistance.

Scratch resistant coatings, such as silica-containing solutions and polysilicic acid fluorinated copolymer compositions, are available in the prior art. These materials have found only limited commercial use because they are difficult to apply, poor in humidity resistance, or expensive. The coating composition of the present invention is based on relatively inexpensive commercially available materials which are easily applied to substrates to provide an abrasion-resistant surface having good weathering characteristics.

Thus, it is an object of the present invention to provide a composition suitable as a protective coating for solid substrates. It is another object of the invention to provide an improved abrasion resistant coating for solid substrates, especially transparent substrates. It is a further object of the invention to provide dispersions from which the coatings of the invention can be applied. These and other objects of the invention will be apparent to one skilled in the art upon consideration of the following description and appended claims.

DESCRIPTION OF THE INVENTION

In accordance with the present invention, there is provided an unpigmented coating composition comprising a dispersion of colloidal silica in lower aliphatic alcohol-water solution of the partial condensate of a silanol of the formula $RSi(OH)_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$, said composition containing 10 to 50 weight percent solids said solids consisting essentially of 10 to 70 weight percent colloidal silica and 30 to 90 weight percent of the partial condensate, said composition containing sufficient acid to provide a pH in the range of 3.0 to 6.0.

As described above the nonvolatile solids portion of the coating composition is a mixture of colloidal silica and the partial condensate of a silanol. The major portion of the partial condensate or siloxanol is obtained from the condensation of $CH_3Si(OH)_3$; a minor portion, if desired, being obtained from cocondensation with $C_2H_5Si(OH)_3$, $C_3H_7Si(OH_3)_3$, $CH_2=CHSi(OH_3)_3$,

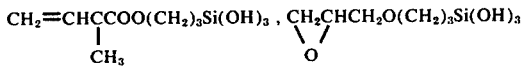

or mixtures thereof. From both the standpoint of economy and optimum properties in the cured coating it is preferred to utilize all monomethyltrisilanol in formulating the composition.

As will be described in detail in the examples, the trisilanols are generated in situ by adding the corresponding trialkoxysilanes to acidic aqueous dispersions of colloidal silica. Suitable trialkoxysilanes are those containing methoxy, ethoxy, isopropoxy and t-butoxy substituents, which upon hydrolysis liberate the corresponding alcohol; thus, generating at least a portion of the alcohol present in the coating composition. Upon generation of the silanol in the acidic aqueous medium, there is condensation of the hydroxyl substituents to form —Si—O—Si— bonding. The condensation is not complete, but rather the siloxane retains an appreciable quantity of silicon-bonded hydroxyl groups, thus rendering the polymer soluble in the water-alcohol solvent. This soluble partial condensate can be characterized as a siloxanol polymer having at least one silicon-bonded hydroxyl group per every three —SiO— units. During curing of the coating on a substrate, these residual hydroxyls condense to give a silsesquioxane, $RSiO_{3/2}$.

The silica component of the composition is present as colloidal silica. Aqueous colloidal silica dispersions generally have a particle size in the range of 5 to 150 millimicrons in diameter. These silica dispersions are prepared by methods well-known in the art and are commercially available under such registered trademarks as "Ludox" and "Nalcoag". It is preferred to use colloidal silica of 10–30 millimicron particle size in order to obtain dispersions having a greater stability and to provide coatings having superior optical properties. Colloidal silicas of this type are relatively free of $Na_2O$ and other alkali metal oxides, generally containing less than 2 weight percent, preferably less than 1 weight percent $Na_2O$. They are available as both acidic and basic hydrosols. Colloidal silica is distinguished from other water dispersable forms of $SiO_2$, such as nonparticulate polysilicic acid or alkali metal silicate solutions, which are not operative in the practice of the present invention.

The silica is dispersed in a solution of the siloxanol carried in a lower aliphatic alcohol-water cosolvent. Suitable lower aliphatic alcohols include methanol, ethanol, isopropanol, and t-butyl alcohol. Mixtures of such alcohols can be used. Isopropanol is the preferred alcohol and when mixtures of alcohol are utilized it is preferred to utilize at least 50 weight percent of isopropanol in the mixture to obtain optimum adhesion of the coating. The solvent system should contain from about 20 to 75 weight-percent alcohol to ensure solubility of the siloxanol. Optionally one can utilize an additional water-miscible polar solvent, such as acetone, butyl cellosolve and the like in a minor amount, for example, no more than 20 weight percent of the cosolvent system.

To obtain optimum properties in the coating and to prevent immediate gellation of the coating composition, sufficient acid to provide a pH of from 3.0 to 6.0 must be present. Suitable acids include both organic and inorganic acids such as hydrochloric, acetic, chloroacetic, citric, benzoic, dimethylmalonic, formic, glutaric, glycolic, maleic, malonic, toluene-sulfonic, oxalic and the like. The specific acid utilized has a direct effect on the rate of silanol condensation which in turn determines shelf life of the composition. The stronger acids, such as hydrochloric and toluenesulfonic acid, give appreciably shortened shelf or bath life and require less ageing to obtain the described soluble partial condensate. It is preferred to add suficient water-miscible carboxylic acid selected from the group consisting of acetic, formic, propionic and maleic acids to provide pH in the range of 4 to 5.5 in the coating composition. In addition to providing good bath life, the alkali metal salts of these acids are soluble, thus allowing the use of these acids with silicas containing a substantial (greater than 0.2% $Na_2O$) amount of alkali metal or metal oxide.

The coating compositions are easily prepared by adding trialkolxysilanes, such as $RSi(OCH_3)_3$, to colloidal silica hydrosols and adjusting the pH to the desired level by addition of the organic acid. The acid can be added to either the silane or the hydrosol prior to mixing the two components provided that the mixing is done rapidly. The amount of acid necessary to obtain the desired pH will depend on the alkali metal content of the silica but is usually less than one weight percent of the composition. Alcohol is generated by hydrolysis of the alkoxy substituents of the silane, for example, hydrolysis of one mole of $-Si(OC_2H_3)_3$ generates 3 moles of ethanol. Depending upon the percent solids desired in the final composition, additional alcohol, water or a water-miscible solvent can be added. The composition should be well mixed and allowed to age for a short period of time to ensure formation of the partial condensate. The coating composition thus obtained is a clear or slightly hazy low viscosity fluid which is stable for several days. The condensation of $\equiv SiOH$ continues at a very slow rate and the composition will eventually form gel structures. The bath life of the composition can be extended by maintaining the dispersion at below room temperature, for example at 40° F.

Buffered latent condensation catalysts can be added to the composition so that milder curing conditions can be utilized to obtain the optimum abrasion resistance in the final coating. Alkali metal salts of carboxylic acids, such as potassium formate, are one class of such latent catalysts. The amine carboxylates and quaternary ammonium carboxylates are another such class of latent catalysts. Of course the catalysts must be soluble or at least miscible in the cosolvent system. The catalysts are latent to the extent that at room temperature they do not appreciably shorten the bath life of the composition, but upon heating the catalysts dissociates and generates a catalytic species active to promote condensation, for example an amine. Buffered catalysts are used to avoid effects on the pH of the composition. Certain of the commercially available colloidal silica dispersions contain free alkali metal base which reacts with the organic acid during the adjustment of pH to generate the carboxylate catalysts in situ. This is particularly true when starting with a hydrosol having a pH of 8 or 9. The compositions can be catalyzed by addition of carboxylates such as dimethylamine acetate, ethanolamine acetate, dimethylaniline formate, tetraethylammonium benzoate, sodium acetate, sodium propionate, sodium formate or benzyltrimethylammonium acetate. The amount of catalyst can be varied depending upon the desired curing condition, but at about 1.5 weight percent catalyst in the composition, the bath life is shortened and optical properties of the coating may be impaired. It is preferred to utilize from about 0.05 to 1 weight percent of the catalyst.

To provide the greatest stability in the dispersion form while obtaining optimum properties in the cured coating, it is preferred to utilize a coating composition having a pH in the range of 4–5 which contains 10–25 weight percent solids; the silica portion having a particle size in the range of 5–30 millimicrons; the partial condensate of $CH_3Si(OH)_3$ being present in an amount in the range of 35 to 55 weight percent of the total solids in a cosolvent of methanol, isopropanol and water, the alcohols representing from 30 to 60 weight percent of the cosolvent and a catalyst selected from the group consisting of sodium acetate and benzyltrimethylammonium acetate being present in an amount in the range of 0.05 to 0.5 weight percent of the composition. Such a composition is relatively stable, having a bath life of approximately one month, and, when coated onto a substrate, can be cured in a relatively short time at temperatures in the range of 75°–125° C. to provide a transparent abrasion resistant surface coating.

The coating compositions of the invention can be applied to solid substrates by conventional methods, such as flowing, spraying or dipping to form a continuous surface film. Although substrates of soft plastic sheet material show the greatest improvement upon application of the coating, the composition can be applied to other substrates, such as wood, metal, printed surfaces, leather, glass, ceramics and textiles. As noted above, the compositions are especially useful as coatings for dimensionally stable synthetic organic polymeric substrates in sheet or film form, such as acrylic polymers, for example, poly(methylmethacrylate), polyesters, for example poly(ethyleneterephthalate) and polycarbonates, such as poly(diphenylolpropane)carbonate and poly(diethylene glycol bis allyl)carbonate, polyamides, polyimides, copolymers of acrylonitrile-styrene, styrene-acrylonitrile-butadiene copolymers, polyvinyl chloride, butyrates, polyethylene and the like. Transparent polymeric materials coated with these compositions are useful as flat or curved enclosures, such as windows, skylights and windshields, especially for transportation equipment. Plastic lenses, such as acrylic or polycarbonate ophthalmic lenses, can be coated with the compositions of the invention. In certain applications requiring high optical resolution, it may be desirable to filter the coating composition prior to applying it to the substrate. In other applications, such as corrosion-resistant coatings on metals, the slight haziness (less than 5%) obtained by the use of certain formulations, such as those containing citric acid and sodium citrate, is not detrimental and filtration is not necessary.

By choice of proper formulation, including solvent, application conditions and pretreatment (including the use of primers) of the substrate, the coatings can be adhered to substantially all solid surfaces. A hard solvent-resistant surface coating is obtained by removal of the solvent and volatile materials. The composition will air dry to a tack-free condition, but heating in the range of 50 to 150° C is necessary to obtain condensation of residual silanols in the partial condensate. This final cure results in the formation of a silsesquioxane of the formula $RSiO_{3/2}$ and greatly enhances the abrasion resistance of the coating. The coating thickness can be varied by means of the particular application technique, but coatings of about 0.5 to 20 micron preferably 2–10 micron thickness are generally utilized. Especially thin coatings can be obtained by spin coating.

The following examples are illustrative and not to be construed as limiting of the invention delineated in the claims.

EXAMPLE 1

Glacial acetic acid (0.2 grams) was added to 200 grams of a commercially available aqueous dispersion of colloidal silica having an initial pH of 3.1 containing 34% $SiO_2$ of approximately 15 millimicron particle size and having a $Na_2O$ content of less than 0.01 weight percent. Methyltrimethoxysilane (138 grams) was added to the stirred acidified dispersion generating methanol and methyltrisilanol. After standing for about one hour, the pH of the composition stabilized at 4.5. Portions of the composition were mixed with ammonium hydroxide or glacial acidic acid to adjust the pH of individual samples to provide compositions ranging in pH from 3.7 to 5.6. These compositions were aged for 4 days to ensure formation of the partial condensate of $CH_3Si(OH)_3$ in the silica methanol-water dispersion. The composition contained 40% solids, half of which was $SiO_2$ and the other half silicone calculated on the basis $CH_3SiO_{3/2}$ weight available in the cured composition.

Six grams of each composition were flow-coated onto biaxially oriented, stretched panels of poly(methylmethacrylate). The acrylic panels were 4 × 6 × 0.187 inches and had been previously cleaned with isopropanol. The coated panels were allowed to air dry for 1½ hours at room temperature and then cured at 185° F for 4 hours in a forced air oven.

Portions of the aged compositions were diluted to 25 weight % solids by addition of isopropanol, coated onto acrylic panels and cured in the same manner. Other portions of the compositions were aged for a total of eight days, then coated onto acrylic panels and subjected to the same curing cycles.

The adhesion and abrasion resistance of all the coatings was determined. Adhesion, as measured by pulling adhesive tape from a ⅛ inch crosshatched grid of the coating, was excellent to good except for a partial failure noted in some of the 8-day coatings. Abrasion resistance was determined by subjecting the coatings to circular rubbing with No. 0000 steel wool for five revolutions at 25 p.s.i. loading. The increase of optical haze of the abraded area was then measured by means of a Gardner large area hazemeter. The abrasion resistance data for the coatings at various pH levels and days of aging are tabulated below:

| Abrasion Resistance - % Delta Haze | | | | | | | | |
|---|---|---|---|---|---|---|---|---|
| pH of Composition | 3.7 | | 4.5 | | 5.0 | | 5.6 | |
| % Solids in Composition | 40 | 25 | 40 | 25 | 40 | 25 | 40 | 25 |
| % Δ Haze 4 day Composition | 6 | 4 | 0.4 | 0.8 | 0.4 | 0.5 | 6 | 6 |
| % Δ Haze 8 day Composition | 6 | 4 | 6 | 2 | 2 | 2 | 5* | 6 |

*small gel particles in sample

Uncoated panels of this same stretched acrylic sheet show an increase in % haze of 32–35 percent when tested by this method. These data demonstrate the effect of pH, percent solids and aging. The compositions having a pH of 4.5 and 5.0 were stable for over 21 days and gave the best scratch resistance.

A portion of the composition having a pH of 4.5 and diluted to 25% solids with isopropanol was catalyzed by the addition of 0.28 weight percent benzyltrimethylammonium acetate after five days ageing. The catalyzed compositions was flow-coated onto transparent, glass-reinforced polyester panels which are commercially available as a glazing material for solar energy collectors. The coating was cured at 70° C. for 6 hours. Adhesion of the coating was excellent and there was a slight improvement in light transmission. Abrasion resistance of the coating was good. Based on testing of other substrates, it is anticipated that long term weathering test will show substantial improvement in the weatherability of the panels.

EXAMPLE 2

A coating composition containing 37 weight percent solids, 50% of which were $SiO_2$, was formulated by adding a basic colloidal dispersion of 13–14 millimicron silica (pH of 9.8, $Na_2O$ content of 0.32%) to methyltrimethoxysilane which had been acidified by the addition of 2.5 weight percent glacial acetic acid. After 4 hours mixing, the composition was divided into portions which were then adjusted to a pH of 3.9, 4.5 or 5.0 by addition of more glacial acetic acid. The compositions were then diluted to 25% solids by addition of isopropanol, aged for 4 days, coated onto acrylic panels, cured and tested in the manner described in Example 1. All panels showed no change in haze upon being abraded with the steel wool. This increase in hardness as compared to the coating of Example 1, especially that obtained from the composition at a pH of 3.7, is attributed to the catalytic action of sodium acetate which was formed upon addition of the colloidal silica to the acidified silane. The undiluted compositions (37% solids) were less stable and gelled within the 4 day aging period because of the presence of the catalyst. A coating composition the same as described above having a pH of 4.5 and 25% solids was aged for 3 days and used to dip coat six spodumene ceramic heat exchanger core samples. The remaining coating composition was then diluted to 20% with a 50/50 isopropanol-water cosolvent and used to dip coat six cordierite heat exchanger core samples having relatively small air passages. All coated specimens were cured at 100° C for 6 hours. Three of each type of core were cured at 350° C for an additional 20 hours. All of the coated cores exhibited improved strength and were more resistant to hot corrosive gases.

EXAMPLE 3

A number of coating compositions utilizing various trimethoxysilanes were prepared. The compositions were prepared by adding the appropriate amount of silane to the aqueous colloidal silica dispersion described in Example 1 which had been acidified by the addition of 1 weight percent glacial acetic acid to a pH of about 4.5. The solids consisted of 50 weight percent $SiO_2$ and 50 weight percent of the partial condensate of $RSi(OH)_3$, calculated as $RSiO_{3/2}$. After 3 days, the compositions were diluted to 20% solids with isopropanol. In the case of where R was $CF_3CH_2CH_2-$,

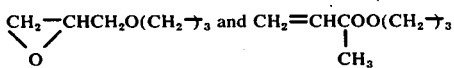

gellation occurred within this three day period. Fresh compositions were formulated and diluted to 20% solids with isopropanol after 4 hours and allowed to stand for 2 days.

The compositions were coated onto clean stretched acrylic panels, as previously described, allowed to air-dry for 15 minutes and then cured for four hours at 85° C. The coated panels were tested for abrasion resistance by means of the described steel wool abrasion test. Results obtained by the use of the different silanes are tabulated below:

| Silane Used<br>In Coating Composition | Abrasion Resistance of Coating<br>(% Change in Haze) |
| --- | --- |
| $CH_3Si(OCH_3)_3$ | 3.2 |
| $C_2H_5Si(OCH_3)_3$ | Composition gelled |
| $CH_2=CHSi(OCH_3)_3$ | 9.0 |
| $C_3H_7Si(OCH_3)_3$ | 45.5 |
| $CF_3CH_2CH_2Si(OCH_3)_3$ | 33.5 |
| $CH_2=CHCOO(CH_2)_3Si(OCH_3)_3$<br>           \|<br>           $CH_3$ | 50.7 |
| $CH_2-CHCH_2O(CH_2)_3Si(OCH_3)_3$<br> \\ /<br>  O | 39.0 |

A mixture of silanes was utilized in formulating the above type of composition. A mixture of 90 weight percent $CH_3Si(OCH_3)_3$ and 10 weight percent $CF_3CH_2CH_2Si(OCH_3)_3$ used in place of the monomethyltrimethoxysilane in the composition gave a coating exhibiting a delta haze of 2.0%. A similar coating formed from a mixture of 80% $CH_3Si(OCH_3)_3$ and 20%

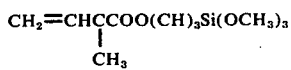

had equivalent abrasion resistance.

These data demonstrate the necessity of using compositions containing a major amount of the partial condensate of $CH_3Si(OH)_3$. Those cured coatings based on other silsesquioxanes, such as $C_3H_7SiO_{3/2}$ and

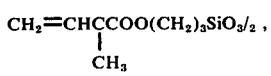

were softer than the acrylic surface itself.

EXAMPLE 4

Various amounts of methyltrimethoxysilane were added to an acidified aqueous colloidal dispersion as described in Example 1 and the pH of the compositions was adjusted to 4.5. After four days the compositions were diluted to 20% solids with isopropanol and flow-coated onto acrylic panels, air-dried and cured for two hours at 85° C. Abrasion resistance (%Δ haze from the steel wool test) of the different coatings is tabulated below:

| Composition of<br>Cured Coating | % Change<br>in Haze |
| --- | --- |
| 10% $CH_3SiO_{3/2}$<br>90% $SiO_2$ | * |
| 20% $CH_3SiO_{3/2}$<br>80% $SiO_2$ | * |
| 30% $CH_3SiO_{3/2}$<br>70% $SiO_2$ | 1.0 |
| 40% $CH_3SiO_{3/2}$<br>60% $SiO_2$ | 2.0 |
| 50% $CH_3SiO_{3/2}$<br>50% $SiO_2$ | 0.4 |

*coating flaked off when cured.

The data demonstrate that a minimum amount (at least 25–30 weight percent) of $CH_3SiO_{3/2}$ must be present in the coating.

EXAMPLE 5

Different amounts of sodium acetate were added to an acidified colloidal dispersion which was initially substantially free of alkali metal salts. Sufficient methyltrimethoxysilane was added to the dispersion to form a 50/50 —$SiO_2/CH_3SiO_{3/2}$ coating and the pH of each composition was adjusted to 4.5 by addition of glacial acetic acid. After 1 to 4 days the compositions were diluted to 20 percent solids with isopropanol, coated onto acrylic panels and cured for 4 hours at 85° C. Abrasion resistance (%Δ haze by steel wool abrasion) is tabulated below:

| Wt. % Sodium Acetate<br>Present in Original<br>Silica Dispersion | % Change in<br>Haze Upon<br>Abrasion |
| --- | --- |
| 0 | 1.0* |
| 0.0625 | 0.3* |
| 0.125 | 0.3 |
| 0.25 | 0.5 |
| 0.50 | 0.8 |
| 1.0 | 0.3 |
| 2.0 | 14.8 |

*coated after four days, all others coated after one day.

Equivalent results (Δ haze of less than 1%) were obtained when trimethylbenzyl ammonium acetate was used in amounts in the range of 0.05 to 0.25 weight percent of the composition. Following the above procedure, the optimum amount of any of the latent catalysts described in the specification can be readily determined.

EXAMPLE 6

For purposes of comparison, ethylorthosilicate was utilized as the $SiO_2$ source as disclosed in U.S. Pat. No. 3,642,681. One hundred grams of ethylorthosilicate was hydrolyzed by addition to 47 grams of ethanol in 45 grams of 0.1N aqueous hydrochloric acid. After one hour sufficient amounts of various silanes were added to samples of the hydrolyzed $(C_2H_5O)_4Si$ to form a composition in which 50% of the solids were $SiO_2$.

revolutions being reported as the multiple of the number of revolutions necessary to give this same amount of haze on uncoated acrylic panels.

| Panel | Taber Abrasion (X Acrylic) | |
|---|---|---|
|  | Minimum Abraded Area | Maximum Abraded Area |
| Uncoated polycarbonate | 24 X | 24 X |
| 40 $SiO_2$/60 $CH_3SiO_{3/2}$ uncatalyzed | 580 X | 375 X |
| 40 $SiO_2$/60 $CH_3SiO_{3/2}$ catalyzed | 670 X | 350 X |

These solutions were diluted with isopropanol and acetic acid to give 10% solutions which would wet acrylic panels. After coating, the panels were heated at 85° C. for 16 hours to ensure complete cure. Abrasion resistance was determined by the previously described steel wool test. Results are tabulated below:

| Silane Added to the Ethylorthosilicate Solution | % Δ Haze |
|---|---|
| $CH_3Si(OCH_3)_3$ | 18.7 |
| $CH_2\!=\!CHSi(OCH_3)_3$ | 25.7 |
| $CH_2\!=\!CHCCOO(CH_2)_3Si(OCH_3)_3$<br>           |<br>           $CH_3$ | 21.5 |

These data demonstrate the inferior performance of silica solutions of hydrolyzed ethylorthosilicate when used in the practice of the present invention. The silica must be in the form of a colloidal dispersion in order to obtain superior abrasion resistance.

EXAMPLE 6

Methyltrimethoxysilane (50.0 grams) was acidified with 1.0 gram of acetic acid. A collodial silica dispersion (66.7 grams) as described in Example 2 was added to the acidified silane to provide a methanol-water dispersion of silica and soluble partial condensate. The solids were 40% $SiO_2$ and 60% the partial condensate of $CH_3Si(OH)_3$ when calculated as $CH_3SiO_{3/2}$. After diluting to 22.5% solids, with isopropanol, the pH of the composition was adjusted to 5.35. After 5 days, the composition was filtered and coated onto panels of poly(diethyleneglycolbis alkyl) carbonate which had been treated by soaking overnight in a 10% solution of potassium hydroxide. The coating was cured at 100° C. for 2 hours.

A second portion of the described coating composition was catalyzed by addition of 0.1 weight percent trimethylbenzyl ammonium acetate, coated onto silvered acrylic panels (mirrors) and onto panels of polycarbonate, pretreated as described above. The catalyzed coatings were cured at 85° C. for 2 hours.

The coated panels, both mirrored acrylic and polycarbonate, were tested by the circular steel wool rubbing method and showed a delta haze of less than 1%.

The coated polycarbonate panels were tested by the Taber Abrasion test method. The coatings were abraded until 10% haze was developed, the number of As with poly(methylmethacrylate) the poly(diethyleneglycol bis allyl) carbonate is especially useful in molding ophthalmic lenses. After molding, such lenses can be coated with the compositions of the invention to provide an extended service life.

Panels of commercially available transparent polycarbonate (bisphenol-A polycarbonate sold under the trademark "Lexan") were primed with a 5% solution of a silane-modified epoxy in Dowanol-EM and allowed to air dry. The epoxy primer was a mixture of about 20% beta-aminoethyl-gamma-aminopropyltrimethoxysilane in a commercially available liquid epoxy sold under the trademark "DER-331" by The Dow Chemical Company. The primed panels were coated on a composition the same as that described in Example 1 (pH = 3.9) which was diluted to 25% solids with isopropanol and catalyzed by addition of 0.2 weight percent trimethylbenzyl ammonium acetate. The coating passed the cross-hatching tape adhesion test and the abrasion resistance was also excellent.

Other polymer substrates which benefit from use of the coating of the present invention include polyvinyl chloride, polystyrene, silicone resin and and rubber, cellulosic thermoplastics, polyesters and the like.

EXAMPLE 7

Methyltrimethoxysilane (75.7 parts) which had been acidified with 18.9 parts acetic acid was mixed with 126.1 parts of the 50% solids basic colloidal silica dispersion described in Example 1. There was a slight exotherm and the mixture was cooled. After five hours another 8 parts acetic acid was added to provide a pH of 4.5. After eleven hours the composition was diluted by addition of 100 parts isopropanol. The composition was then aged for 3½ days and dip coated onto stretched acrylic panels. The coating was air dried and then cured for 4 hours at 185° F.

Coated panels were placed in a humidity test chamber maintained at 165° F and 100% humidity. Other coated panels were exposed in a weatherometer under the conditions described in ASTM-G-25–70. For purposes of comparison, a commercially available acrylic sheet coated with a polysilicic acid/fluoroolefin-hydroxyalkyl vinyl ether copolymer was also tested. Results of the steel wool abrasion test (25 p.s.i.) after the indicated number of revolutions and exposure times are tabulated below:

| Exposure Conditions | Coating Material | Abrasion Resistance (% Δ Haze) After | | | Appearance before Abrasion |
|---|---|---|---|---|---|
|  |  | 5 Rev. | 10 Rev. | 15 Rev. |  |
| Initial (no exposure) | 50% $SiO_2$ 50% $SiO_{3/2}$ | 0.7 | 0.8 | 1.0 | good |
|  | Polysilicic acid/ fluoro copolymer | 1.6 | 2.2 | 3.5 | Excellent |
| 120 Hrs. - |  |  |  |  |  |

-continued

| Exposure Conditions | Coating Material | Abrasion Resistance (% Δ Haze) After | | | Appearance before Abrasion |
|---|---|---|---|---|---|
| | | 5 Rev. | 10 Rev. | 15 Rev. | |
| Humidity Chamber | 50% $SiO_2$ 50% $CH_3SiO_{3/2}$ | 0.2 | 0.2 | 1.9 | good |
| | Polysilicic acid/ fluoro copolymer | 40.2 | — | — | permanent water spots |
| 240 Hrs. - Humidity Chamber | 50% $SiO_2$ 50% $CH_3SiO_{3/2}$ | 0.6 | 1.4 | 5.6 | good |
| | Polysilicic acid/ fluoro copolymer | 44.0 | — | — | permanent water spots |
| 7 Days - Weatherometer | 50% $SiO_2$ 50% $CH_3SiO_{3/2}$ | 0.5 | 0.7 | 0.5 | good |
| | Polysilicic acid/ fluoro copolymer | 1.8 | 5.4 | 15.7 | good |

Another acrylic panel coated with the above-described composition of the invention was exposed for over 21 days in the weatherometer and was not visibly scratched by the steel wool at 25 p.s.i. loading after 5 revolutions.

Other acrylic panels coated and cured as described above were submitted to other testing to determine utility as enclosures (windshields) for transportation equipment. After a gauze pad soaked in the particular solvent was placed on the cured coating and covered with a watch glass for 24 hours at room temperature, there was no apparent effect from such contact with benzene, toluene, xylene, trichloroethane, acetone, ethyl acetate, butylamine, methanol, isopropanol, permanent antifreeze, gasoline or motor oil.

Another such coated acrylic panel was abraded with a windshield wiper blade loaded at 0.33 lbs./in. of length moving in an arc at 80 cycles per minute. A 15% sodium chloride solution was sprayed on the test panel surface at 5-minute intervals. The test was terminated after 12,420 cycles and there was no visible effect on the arc surface area.

Thermal shock characteristics of the coating were determined by temperature cycling of a coated panel from $-65°$ F. to $+160°$ F in about 20 minutes. After six cycles, the coating remained intact with no apparent effect on optical properties.

These data demonstrate that in addition to abrasion resistance the coatings of the invention possess excellent weathering characteristics, solvent resistance and thermal stability.

EXAMPLE 8

A coating composition similar to that described in Example 7 except that isopropanol was not present was sprayed onto clean aluminum panels. After air-drying for 24 hours, the coated panels were tested in a Dew Cycle Weatherometer. After 100 hours of testing, the panels showed very low corrosion (2%) and there was no blistering in the coating. These data demonstrate the utility of the compositions as corrosion resistant coatings for metal.

EXAMPLE 9

The utility of various organic acids in formulating the compositions of the invention was demonstrated by diluting formic and maleic acid to 25% solutions with a 50/50 isopropanol-water cosolvent. Oxalic acid was diluted to a 12.5% solution with the same cosolvent. Each of the diluted acids was added to 10.0 gram portions of a 30% solids aqueous collodial silica having 13-14 millimicron particles, a pH of 9.8 and $Na_2O$ (titratable alkali) of 0.32%. Sufficient acid was added to bring the pH down to the range 3.5 to 4.1. Methyltrimethoxysilane (6.0 grams) was added to each of the acidified silicas. After 30 minutes mixing, the compositions were reduced to 25% solids by the addition of isopropanol and aged for about 18 hours. The composition based on oxalic acid contained a small amount of precipitate which had settled out during ageing. The aged compositions were flow coated onto glass microscope slides, air-dried and then cured at 100° C for 2½ hours.

The clear cured coatings were tested for abrasion resistance by attempting to mar the surface with a pencil eraser. The abrasion resistance of the composition acidified with formic acid was excellent, while the coating based on maleic and oxalic acid exhibited very good abrasion resistance.

EXAMPLE 10

The procedure of Example 9 was repeated utilizing a 25% solution of glycolic acid and a colloidal silica dispersion containing about 0.05% $Na_2O$ and having an initial pH of 3.1. After dilution to 25% solids with isopropanol the pH was 3.6. After ageing for about 4 hours, about 25 grams of the composition was catalyzed with 0.15 grams of a 10% solution of benzyltrimethylammonium acetate raising the pH to 4.7. When coated onto a glass slide and cured, the clear coating had good to very good abrasion resistance when tested with an eraser.

The coating composition was then further catalyzed by the addition of 0.5 grams of 10% isopropanol solution of triethylamine which elevated the pH to 5.2. The coating, cured on to glass slides, exhibited very good abrasion resistance but have a slight (about 3% haze) reduction in light transmission upon curing. This small amount of haze is not objectionable when the coating is used in applications other than the optical area.

EXAMPLE 11

Three different aqueous colloidal silicas were blended to provide a 32% solids dispersion containing one-third of 50-70 millimicron-sized particles, one-third of 15-17 millimicron sized particles and one-third 6-7 millimicron sized particles having an $Na_2O$ content of about 0.2 weight percent. Acetic acid (2.25 grams in 10 ml. of water) was added to 87.5 grams of colloidal silica dispersion. After acidification, 45 grams of methyltrimethoxysilane was added rapidly and the mixture was shaken. After 45 minutes, hydrolysis was considered complete and 57.75 grams of isopropanol was added to provide a coating composition containing 25% solids (calculated on the weight of $SiO_2$ plus $CH_3SiO_{3/2}$) and having a pH of 5.4.

After 2 days ageing, the solution/dispersion of colloidal silica and partial condensate was filtered and a portion was coated onto one-eighth inch thick stretched acrylic sheet. After air-drying for 30 minutes, the coating was cured for 4 hours at 80° C.

When tested for abrasion resistance with steel wool as described in Example 1 there was no apparent change in haze. The number of revolutions was increased to 25, but there was still no measurable abrasion. The loading was then increased from 25 p.s.i. to 35 p.s.i. and after 10 revolutions there was no measurable increase in haze. The exceptional hardness of this coating is believed to result from the more dense packing of particles obtained by use of the blend of different particle sizes.

A second portion of the aged coating composition was flow-coated onto a 100 mil-thick molding of a commerically available styrene-acrylonitrile copolymer (Tyril from The Dow Chemical Company, Midland, Mich. which had been primed with the silane-modified epoxy described in Example 6. After air-drying for 30 minutes, the coating was cured for 6 hours at 75° C.

The cured coating exhibited excellent abrasion resistance when subjected to the steel wool rubbing test. A portion of the coating was cross-hatched into one-sixteenth inch squares using a razor blade to cut through to the styrene-acrylonitrile substrate. The cross-hatched coating was not lifted by rapidly removing pressure-sensitive tape previously pressed onto the cut surface. These data demonstrate the abrasion resistance and adhesion obtained by the practice of the invention.

Reasonable modification and variation are within the scope of this invention which is directed to novel pigment-free coating compositions and solid surfaces coated with such materials.

That which is claimed is:

1. An article comprising a solid substrate coated with a pigment free coating composition comprising a dispersion of colloidal silica in lower aliphatic alcohol-water solution of the partial condensate of a silanol of the formula $RSi(OH)_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$, said composition containing 10 to 50 weight percent solids consisting essentially of 10 to 70 weight percent colloidal silica and 30 to 90 weight percent of the partial condensate, said composition containing sufficient acid to provide a pH in the range of 3.0 to 6.0.

2. An article in accordance with claim 1 where in the coating composition, the acid is a water miscible organic acid selected from the group consisting of acetic, formic, propanoic and maleic acid.

3. An article in accordance with claim 2 wherein the coating composition contains from about 0.05 to 1.5 weight percent of a buffered latent silanol condensation catalyst.

4. An article in accordance with claim 3 wherein said solid substrate is transparent.

5. An article in accordance with claim 4 wherein said solid substrate is acrylic polymer.

6. An article in accordance with claim 4 wherein said solid substrate is polyester.

7. An article in accordance with claim 6 wherein the polyester is poly(diphenylol propane) carbonate.

8. An article in accordance with claim 6 wherein the polyester is poly(diethylene glycol bis allyl) carbonate.

9. An article in accordance with claim 4 in the form of a lens.

10. An article in accordance with claim 8 wherein the lens is an ophthalmic lens.

11. An article of claim 1 in which the alcohol in the coating composition is present in an amount in the range of 20 to 75 weight percent based on the total weight of the cosolvent.

12. An article in accordance with claim 11 wherein the coating composition, the acid is a water miscible organic acid selected from the group consisting of acetic, formic, propanoic and maleic acid.

13. An article in accordance with claim 12 wherein the coating composition contains from about 0.05 to 1.5 weight percent of a buffered latent silanol condensation catalyst.

14. An article in accordance with claim 13 wherein said solid substrate is transparent.

15. An article in accordance with claim 14 wherein said solid substrate is acrylic polymer.

16. An article in accordance with claim 14 wherein said solid substrate is polyester.

17. An article in accordance with claim 16 wherein the polyester is poly(diphenylol propane) carbonate.

18. An article in accordance with claim 16 wherein the polyester is poly(diethylene glycol bis allyl) carbonate.

19. An article in accordance with claim 14 in the form of a lens.

20. An article in accordance with claim 18 wherein the lens is an ophthalmic lens.

* * * * *

UNITED STATES PATENT AND TRADEMARK OFFICE
CERTIFICATE OF CORRECTION

PATENT NO. : 4,027,073
DATED : May 31, 1977
INVENTOR(S) : Harold A. Clark

It is certified that error appears in the above-identified patent and that said Letters Patent are hereby corrected as shown below.

In Column 2, line 3; the line reading "with $C_2H_5Si(OH)_3$, $C_3H_7Si(OH_3)_3$, $CH_2=CHSi(OH_3)_3$," should read "$C_2H_5Si(OH)_3$, $C_3H_7Si(OH)_3$, $CH_2=CHSi(OH)_3$,"

In Column 3, line 24; the word reading "trialkolxysilanes" should read "trialkoxysilanes"

In Column 7, line 56; the formula reading "$CH_2=CHCCOO(CH)_3Si(OCH_3)_3$ with $CH_3$ branch" should read "$CH_2=CHCCOO(CH_2)_3Si(OCH_3)_3$ with $CH_3$ branch"

In Column 8, line 65; the formula reading "$SIO_2$" should read "$SiO_2$"

UNITED STATES PATENT AND TRADEMARK OFFICE
CERTIFICATE OF CORRECTION

PATENT NO. : 4,027,073

DATED : May 31, 1977

INVENTOR(S) : Harold A. Clark

Page 2 of 2

It is certified that error appears in the above-identified patent and that said Letters Patent are hereby corrected as shown below:

In Column 13, line 22; the word reading "Tyril" should read "Tyril®"

In Column 13, line 23; the line reading "Mich. which had been primed with the silane-modified" should read "Mich.) which had been primed with the silane-modified"

Signed and Sealed this

Twenty-sixth Day of January 1982

[SEAL]

Attest:

Attesting Officer

GERALD J. MOSSINGHOFF

Commissioner of Patents and Trademarks